(12) United States Patent
Lelievre et al.

(10) Patent No.: US 10,040,381 B2
(45) Date of Patent: Aug. 7, 2018

(54) ALIGNMENT OF MOTOR VEHICLE SEAT CAP PIECES

(71) Applicant: Faurecia Sieges D'Automobile, Nanterre (FR)

(72) Inventors: Francois Lelievre, Vanves (FR); Didier Fouinat, Saint Cheron (FR)

(73) Assignee: Faurecia Sieges D'Automobile, Nanterre (FR)

( * ) Notice: Subject to any disclaimer, the term of this patent is extended or adjusted under 35 U.S.C. 154(b) by 65 days.

(21) Appl. No.: 15/099,329

(22) Filed: Apr. 14, 2016

(65) Prior Publication Data

US 2016/0304014 A1 Oct. 20, 2016

(30) Foreign Application Priority Data

Apr. 16, 2015 (FR) ..................... 15 53404

(51) Int. Cl.

| G06F 11/07 | (2006.01) |
| B60N 2/58 | (2006.01) |
| B29C 59/00 | (2006.01) |
| B29C 59/02 | (2006.01) |
| B29L 31/30 | (2006.01) |

(52) U.S. Cl.
CPC .......... *B60N 2/5891* (2013.01); *B29C 59/002* (2013.01); *B29C 59/02* (2013.01); *B60N 2/5883* (2013.01); *B29L 2031/3005* (2013.01)

(58) Field of Classification Search
CPC ........ A47C 31/02; B60N 2/58; B60N 2/5816; B60N 2/5883

USPC ............. 297/452.58, 452.56, 452.61, 218.2; 29/428, 91.1, 91.4, 91.5

See application file for complete search history.

(56) References Cited

U.S. PATENT DOCUMENTS

| 4,060,280 A | 11/1977 | Van Loo |
| 4,247,346 A | 1/1981 | Maehara et al. |
| 4,247,347 A | 1/1981 | Lischer et al. |
| 4,264,386 A | 4/1981 | Sears, Jr. et al. |
| 4,287,143 A | 9/1981 | Sears, Jr. et al. |
| 4,288,499 A | 9/1981 | Kielbania, Jr. |
| 4,470,857 A | 9/1984 | Casalou |
| 4,772,070 A | 9/1988 | Leto, Jr. et al. |
| 4,792,111 A | 12/1988 | Taguchi |
| 4,795,517 A | 1/1989 | Elliott et al. |

(Continued)

FOREIGN PATENT DOCUMENTS

| CN | 1225058 A | 8/1999 |
| CN | 1723312 A | 1/2006 |

(Continued)

OTHER PUBLICATIONS

"French Search Report", issued in counterpart French Patent Application No. FR1553404, dated Feb. 25, 2016.

(Continued)

*Primary Examiner* — Jose V Chen

(74) *Attorney, Agent, or Firm* — Kaplan Breyer Schwarz, LLP

(57) ABSTRACT

A cover element for a motor vehicle seat element lining, including: a foam on the reverse side of a textile, skin, or synthetic material; and in edges, intended to be assembled by sewing to at least one piece of textile, skin, or synthetic material, one or a plurality of embossed notches forming alignment marks to perform the sewing.

15 Claims, 3 Drawing Sheets

(56) References Cited

U.S. PATENT DOCUMENTS

| | | |
|---|---|---|
| 4,829,644 A | 5/1989 | Kondo et al. |
| 4,831,697 A | 5/1989 | Urai |
| 4,883,320 A | 11/1989 | Izunida et al. |
| 4,892,891 A | 1/1990 | Close |
| 4,894,277 A | 1/1990 | Akasaki |
| 4,927,209 A | 5/1990 | Maruyama |
| 5,000,805 A | 3/1991 | Lowe |
| 5,283,918 A | 2/1994 | Weingartner et al. |
| 5,462,786 A | 10/1995 | Van Ert |
| 5,477,572 A | 12/1995 | Weingartner et al. |
| 5,632,053 A | 5/1997 | Weingartner et al. |
| 5,669,670 A | 9/1997 | Haraguchi et al. |
| 5,830,548 A | 11/1998 | Andersen et al. |
| 6,004,498 A | 12/1999 | Fujii et al. |
| 6,471,908 B1 | 10/2002 | Beckmann |
| 6,842,950 B2 | 1/2005 | Fleuchaus et al. |
| 6,892,433 B2 | 5/2005 | Barry et al. |
| 7,056,457 B2 | 6/2006 | Senoo |
| 7,481,489 B2 | 1/2009 | Demick |
| 7,487,575 B2 | 2/2009 | Smith |
| 7,823,980 B2 | 11/2010 | Niwa et al. |
| 7,837,263 B2 | 11/2010 | Booth et al. |
| 7,946,649 B2 | 5/2011 | Galbreath et al. |
| 8,099,837 B2 | 1/2012 | Santin et al. |
| 8,191,971 B2 | 6/2012 | Lovasz |
| 8,522,406 B2 | 9/2013 | Voigt |
| 8,647,544 B2 | 2/2014 | Burch |
| 8,794,708 B2 | 8/2014 | Besnard et al. |
| 2002/0101109 A1 | 8/2002 | Stiller et al. |
| 2003/0215601 A1 | 11/2003 | Pedde et al. |
| 2003/0228455 A1 | 12/2003 | Panczyk et al. |
| 2005/0006944 A1 | 1/2005 | Ali et al. |
| 2005/0081771 A1 | 4/2005 | Kromm et al. |
| 2006/0141260 A1 | 6/2006 | Haque et al. |
| 2008/0224509 A1 | 9/2008 | Demick |
| 2008/0258523 A1 | 10/2008 | Santin et al. |
| 2008/0309143 A1 | 12/2008 | Booth et al. |
| 2009/0075084 A1 | 3/2009 | Kochi et al. |
| 2009/0085384 A1 | 4/2009 | Galbreath et al. |
| 2009/0295215 A1 | 12/2009 | Galbreath et al. |
| 2009/0302664 A1 | 12/2009 | Galbreath et al. |
| 2010/0041780 A1 | 2/2010 | Friedrich et al. |
| 2011/0059667 A1* | 3/2011 | Meyer ................ B60N 2/58 442/370 |
| 2015/0230564 A1* | 8/2015 | Fujisawa ............ A44B 18/0076 24/444 |
| 2016/0167260 A1 | 6/2016 | Thomas et al. |
| 2016/0167552 A1 | 6/2016 | Rigal et al. |
| 2016/0368405 A1* | 12/2016 | Ishii ................ B60N 2/5891 |

FOREIGN PATENT DOCUMENTS

| | | |
|---|---|---|
| EP | 0387230 A1 | 9/1990 |
| EP | 0396305 | 11/1990 |
| EP | 0618169 A2 | 10/1994 |
| FR | 2785580 A1 | 5/2000 |
| FR | 2939731 A1 | 6/2010 |
| FR | 2941657 A1 | 8/2010 |
| GB | 2006667 A | 5/1979 |
| JP | 2010214997 A | 9/2010 |
| WO | 9114566 A1 | 10/1991 |
| WO | 20150015131 A1 | 2/2015 |
| WO | 20150015132 A2 | 2/2015 |

OTHER PUBLICATIONS

"International Search Report and Written Opinion of the International Searching Authority", dated Jan. 22, 2015, International Application PCT/FR2014/052012, 10 pp.

"Office Action", U.S. Appl. No. 13/055,510, filed Apr. 11, 2011, dated Jun. 13, 2013, 9 pp.

"Office Action", U.S. Appl. No. 13/055,510, filed Apr. 11, 2011, dated Jul. 26, 2013, 13 pp.

"Office Action", U.S. Appl. No. 13/055,510, filed Apr. 11, 2011, dated Dec. 18, 2013, 10 pp.

"Notice of Allowance", U.S. Appl. No. 13/055,510, filed Apr. 11, 2011, dated Mar. 31, 2014, Mar. 31, 2014, 8 pp.

"International Preliminary Report on Patentability", International Patent Application PCT/FR2009/051434, dated Mar. 1, 2011, 8 pp.

"International Search Report and Written Opinion", International Patent Application PCT/FR2009/052011, dated Sep. 22, 2014, 10 pp.

"Written Opinion of the International Searching Authority", dated Jan. 4, 2016, International Patent Application No. PCT/FR2014/052012, 7 pp.

"International Search Report", International Patent Application PCT/FR2009/051434, dated Jan. 25, 2010, 6 pp.

\* cited by examiner

ALIGNMENT OF MOTOR VEHICLE SEAT CAP PIECES

This application claims the priority benefit of French patent application number 15/53404, filed on Apr. 16, 2015, the content of which is hereby incorporated by reference in its entirety to the maximum extent allowable by law.

BACKGROUND

The present disclosure generally relates to motor vehicle seats and, more specifically, to the forming of a cap of a seat element (seat bottom piece, backrest, headrest, armrest). The present disclosure more specifically aims at the preparing of the assembly of a cap of a seat element.

DISCUSSION OF THE RELATED ART

Automobile vehicle seat linings generally appear in the form of a padding covered with a cap. The padding is a foam block, generally molded according to the final shape desired for the seat element. This block is covered with a cap having its apparent surface made of textile (woven or not), of skin, or of a synthetic material. The cap is formed from pieces of the covering material which are assembled to one another by seams. To perform such an assembly and guarantee a proper alignment of the pieces relative to one another, prior to the sewing, marks are generally made in the form of cuts in the edges (heels) of the pieces to be assembled. The cuts are then located on the rear surface and are thus invisible once the cap is assembled.

Another method of forming a seat lining comprises forming this lining in the form of a foam support block adapted to the frame of the seat element and placing, on this support block, a cover element made by forming of a foam sprayed on a substrate and arranged on the reverse side of a textile (woven or not), skin, or synthetic material, to define the apparent shape of the seat element. Such forming methods are for example described in documents WO-A-2010/010281 (B9212-2488), WO2015/015131 (B12467-3421).

SUMMARY

An embodiment aims at overcoming all or part of the disadvantages of known techniques for forming seams of assembly of pieces of a cap for motor vehicle seats.

An embodiment more specifically provides a solution adapted to the assembling of pieces of textile, skin, or synthetic material to an edge of a cover element comprising a foam layer on its back side.

Thus, an embodiment provides a cover element for a lining of a motor vehicle seat element, comprising:

a foam on the reverse side of a textile, skin, or synthetic material; and in edges, intended to be assembled by sewing to at least one piece of textile, skin, or synthetic material, one or a plurality of embossed notches forming alignment marks to perform the sewing.

According to an embodiment, the embossed notches are recessed.

According to an embodiment, the embossed notches are raised.

According to an embodiment, the cover element is obtained by cold forming of a foam sprayed on a substrate and arranged on the reverse side of said textile, skin, or synthetic material.

An embodiment also provides a method of forming marks of alignment of an edge of a cover element comprising a foam on the reverse side of a textile, skin, or synthetic material with at least one piece of textile, skin, or synthetic material, comprising a step of forming, by molding, embossed notches in said edges.

According to an embodiment, notches or strips are arranged in a mold for forming the cover element to define said embossed notches.

According to an embodiment, said embossed notches are formed at intervals in the range from a few centimeters to a few tens of centimeters in the periphery of the cover element.

An embodiment also provides a mold for forming a cover element by forming of a foam sprayed on a substrate and arranged on the reverse side of a textile, skin, or synthetic material, comprising one or a plurality of strips or notches for defining alignment marks.

An embodiment also provides a motor vehicle seat element.

An embodiment also provides a motor vehicle comprising a seat element.

The foregoing and other features and advantages will be discussed in detail in the following non-limiting description of specific embodiments in connection with the accompanying drawings.

BRIEF DESCRIPTION OF THE DRAWINGS

The same elements have been designated with the same reference numerals in the different drawings. For clarity, only those steps and elements which are useful to the understanding of the described embodiments have been shown and will be detailed.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings or to a seat in a normal position of use. Unless otherwise specified, expressions "approximately", "substantially", and in the order of mean to within 10%, preferably to within 5%.

Figure 1:
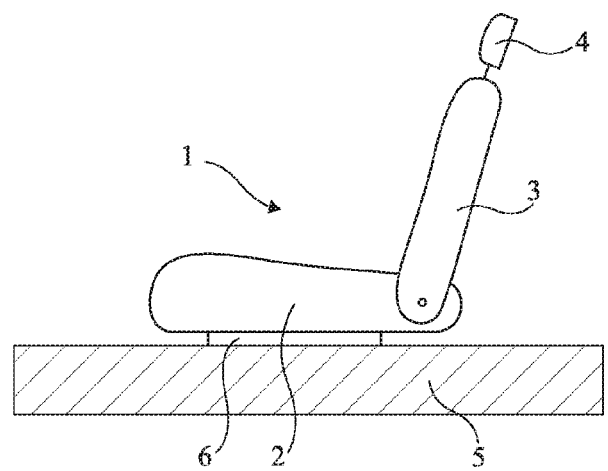
FIG. 1 is a simplified lateral view of a motor vehicle seat.

FIG. 1 is a simplified lateral view of a motor vehicle seat 1. Such a seat comprises a seat bottom piece 2 having a backrest 3, most often topped with a headrest 4, jointed thereto. Seat bottom piece 2, backrest 3, and headrest 4 each comprise a lining fastened to a frame, generally made of metal. Frame 6 of seat bottom piece 2 may be connected to floor 5 of the vehicle by a slide rail mechanism. Seat 1 may also comprise one or several armrests (not shown).

Figure 2:
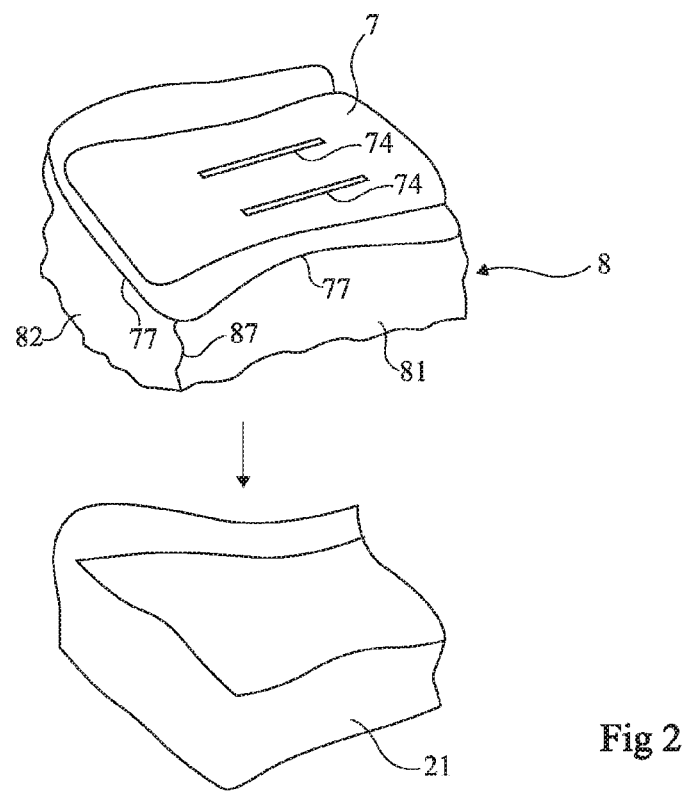
FIGS. 2 and 2A illustrate, in a simplified perspective view and in a cross-section view, the forming of a lining for a seat element of the type to which the described embodiments apply.

FIG. 2 is a simplified perspective view illustrating the forming of a lining of a seat element, for example, a seat bottom piece, in the form of a support block and of a cap comprising a cover element, for example, of the type described in above-mentioned documents WO-A-2010/010281 (B9212-2488) and WO2015/015131 (B12467-3421).

Figure 2A:
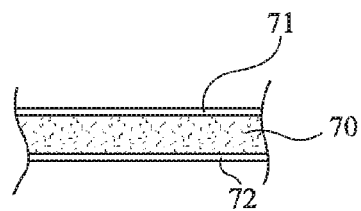

FIG. 2A is a partial cross-section view of cover element 7 of FIG. 2.

A foam support block 21 is formed according to the final shape desired for the seat element, that is, its general aspect, a cover element 7 defining the final shape of the seat element. Cover element 7 is made by forming (typically cold-forming) of a foam 70 sprayed on a substrate 72 and arranged on the reverse side of a textile (woven or not), skin, or synthetic material 71. Material 71 defines the apparent surface of the seat element. Cover element 7, and particularly its foam layer 70, defines the apparent shape of this seat element and, for example, integrates style feature lines 74.

In the embodiment shown in FIG. 2 and targeted by the present description, one or a plurality of pieces, made of textile (woven or not), skin, or synthetic material, are assembled by sewing 77 at the periphery of cover element 7 to form, for example, a skirt 8 covering the sides of support block 21. The shown example assumes that a plurality of pieces 81 and 82 are used to form skirt 8. The pieces may also be assembled to one another by sewing 87. As a variation, a single piece runs all around the seat bottom piece.

Figure 3:
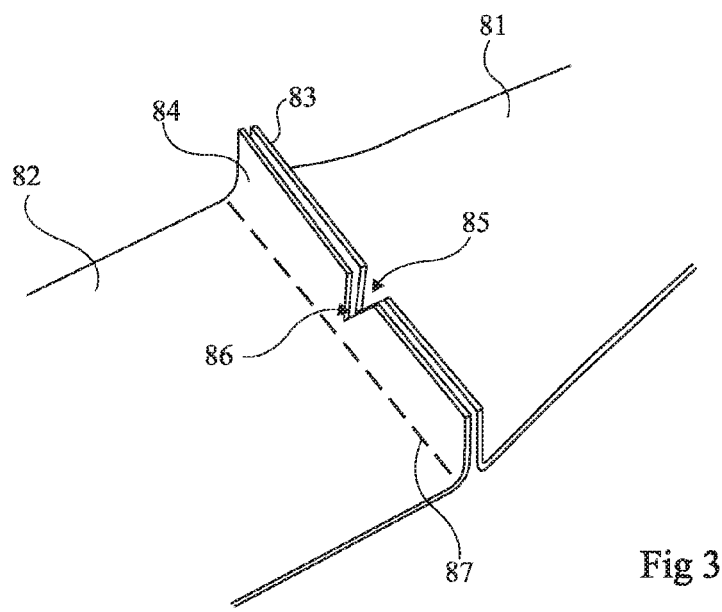
FIG. 3 is a perspective view illustrating the forming of marks of alignment of cap pieces.

FIG. 3 is a simplified perspective view illustrating a usual solution to form alignment marks of cap pieces to be sewn together. This drawing illustrates a possible way of sewing 87 pieces 81 and 82 together.

In this example, two textile pieces 81 and 82 are assembled by a seam 87. Seam 87 is formed at the level of heels 83 and 84 of pieces 81 and 82. To guarantee a correct alignment of the pieces on sewing, alignment marks are formed in advance in the form of cuts 85 and 86 in heels 83 and 84. These cuts are generally V-shaped. Cuts 85 and 86 are formed in cap pieces 81 and 82 before their sewing and enable the operator to properly position the two pieces for their sewing.

Such a solution is adapted to the assembling of cap pieces together but considerably complicates the assembly by sewing of a cover element 7 comprising a foam layer such as illustrated in FIG. 2 to cap pieces made of textile, skin, or synthetic material.

Figure 4:
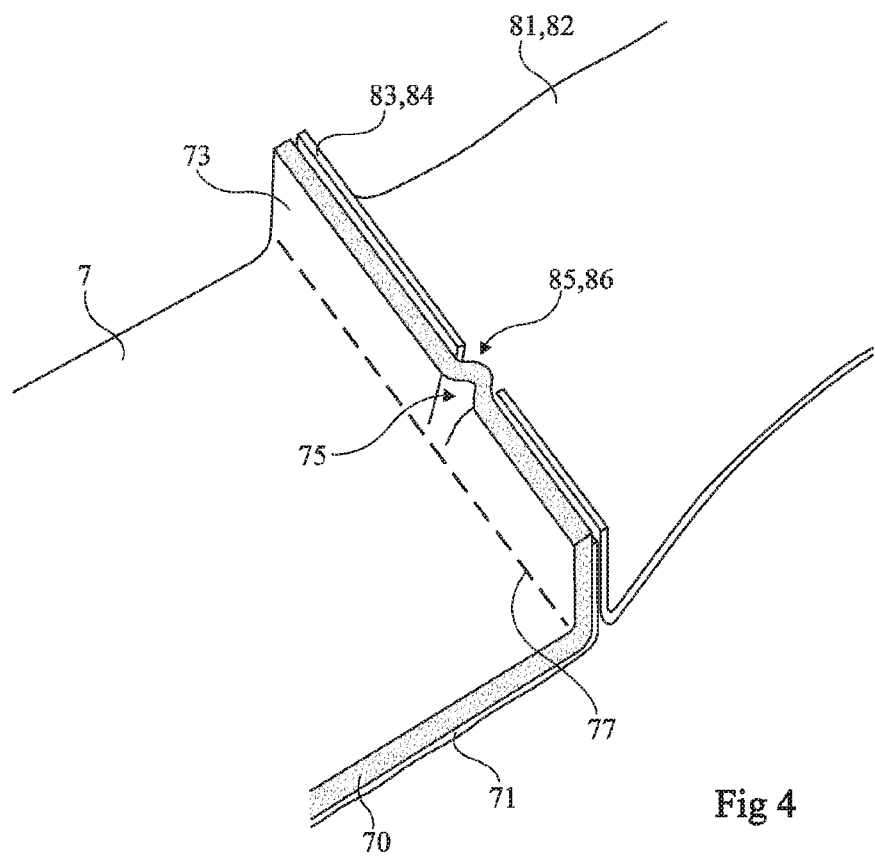
FIG. 4 is a simplified perspective view illustrating an embodiment of alignment marks of a cap piece with a cover element.

FIG. 4 is a simplified view illustrating an embodiment of alignment marks, adapted to a cover element 7 comprising a foam layer.

Cover element 7 is obtained by molding and this molding defines an edge or heel 73 at the level of areas of assembly to pieces (81 and 82, FIG. 2) made of textile, skin, or synthetic material to form, for example, a skirt 8 for covering the support block (21, FIG. 2).

Heel 83 (or 84) of piece 81 (or 82) comprises, like for seams 87, a cut 85 (or 86). Thus, the forming of the cap pieces to be assembled to cover element 7 is not modified.

On the side of cover element 7, it is provided to form, rather than a cut, an embossed notch 75 by the forming of cover element 7. Alignment mark 75 is thus recessed or raised relative to heel 73 of cover element 7.

In practice, a plurality of cuts 85 (or 86) and a plurality of marks 75 are distributed along heels 83 (or 84) and 73, for example, with an interval between alignment marks in the range from a few centimeters to a few tens of centimeters.

On forming of seam 77, the piece of work is placed on the bed of the sewing machine (not shown), piece 81 (or 82) being pressed against cover element 7, the external surface (apparent once on the seat) against the external surface, to form seam 77 on the reverse side of the cap piece and of the cover element. The two heels 73 and 83 (or 84) are placed against each other and mark 75 is aligned with respect to cut 85 (or 86) to guarantee a correct relative positioning of piece 81 (or 82) relative to cover element 7. Once the alignment has been performed, the sewing is performed.

According to the direction in which the work is placed on the bed of the sewing machine, either cut 85 (or 86) enables to see, and thus to locate, mark 75 in top view, or a possibility of observing the work from the bottom of the table is provided in the sewing machine to detect alignment marks.

In an automated installation, the alignment patterns are recognized by means of cameras.

Figure 5:
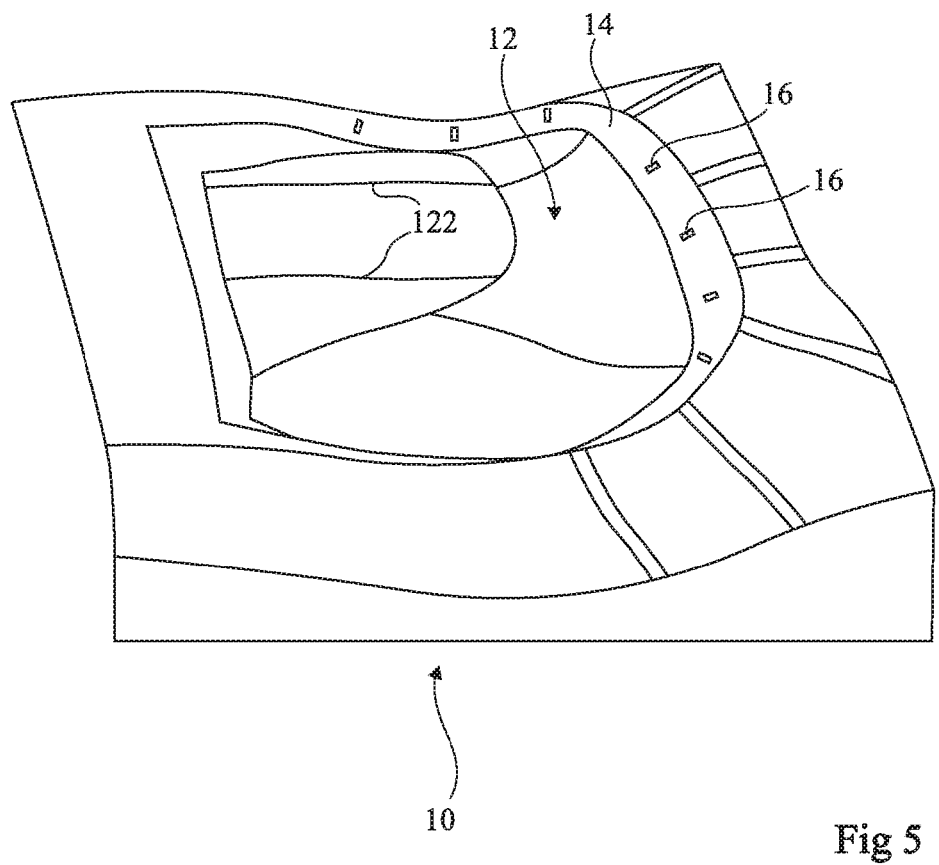
FIG. 5 is a simplified perspective view of an embodiment of a die of a mold for forming a cover element.

FIG. 5 is a perspective view of a die 10 for forming a cover element 7. Die 10 defines, by its upper surface or plate 12, the final shape desired for cover element 7.

According to the envisaged results, the material (71, FIG. 2A), having the foam (70, FIG. 2A) sprayed on the substrate (72, FIG. 2A) arranged on the reverse side thereof, is positioned with its apparent surface on plate 12. The foam layer supported by its substrate is then arranged with the foam on the side of the material. A punch (not shown) is then used to close the mold and carry out the forming, preferably a cold forming, of the cover element. In other embodiments, the foam supported by its substrate is arranged on the reverse side of material 71 before being positioned in die 10.

The shape of the die, and especially of its plate 12, defines the apparent surface of cover element 7 and typically comprises ribs 122 for forming style feature lines.

In the embodiment illustrated in FIG. 5, peripheral portion 14 of the plate, defining the heel (73, FIG. 4) of cover element 7, comprises notches or strips 16 for defining the embossed notches (75, FIG. 4). Strips 16 are distributed on the periphery of plate 12, where the heel of the cover element is intended to be assembled to cap pieces.

Figure 6:
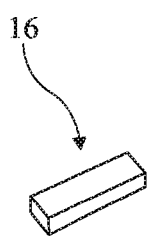
FIG. 6 shows an example of an insert for forming an alignment mark.

FIG. 6 shows an example of a strip 16 in the form of a cuboid for defining a straight embossed notch of the type illustrated in FIG. 4.

Figure 7:
FIG. 7 shows another example of an insert for forming an alignment mark.

FIG. 7 shows another example of strip 16' capable of being placed in the mold to form alignment marks. In this example, strip 16' has a triangular shape to form a V-shaped embossed notch.

It should be noted that the strips or notches of the mold for forming the cover element may be present on the punch side of the mold instead of being on the die side.

Various embodiments have been described. Various alterations and modifications will occur to those skilled in the art. In particular, although the embodiments have been described in relation with an example of lining for a seat bottom piece, they more generally apply to any seat element. Further, the practical implementation of the described embodiments is within the abilities of those skilled in the art based on the functional indications given hereabove. In particular, the thickness of the heels to be provided to form the seams as well as the dimensions of the alignment marks varies from one type of seat to another.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A cover element for a motor vehicle seat element lining, comprising:
   a foam on a reverse side of a textile, skin, or synthetic material; and
   in edges, intended to be assembled by sewing to at least one piece of textile, skin, or synthetic material, one or a plurality of embossed notches forming alignment marks with the at least one piece of textile, skin, or synthetic material.

2. The cover element of claim 1, wherein the embossed notches are recessed with respect to a side of the foam.

3. A motor vehicle seat element comprising the cover element of claim 2.

4. A motor vehicle seat comprising the seat element of claim 3.

5. The cover element of claim 1, wherein the embossed notches are raised in a direction of the least one piece of textile, skin, or synthetic material.

6. A motor vehicle seat element comprising the cover element of claim 5.

7. A motor vehicle seat comprising the seat element of claim 6.

8. The cover element of claim 1, obtained by cold forming of a foam sprayed on a substrate and arranged on the reverse side of said textile, skin, or synthetic material.

9. A motor vehicle seat element comprising the cover element of claim 8.

10. A motor vehicle seat comprising the seat element of claim 9.

11. A motor vehicle seat element comprising the cover element of claim 1.

12. A motor vehicle seat comprising the seat element of claim 11.

13. A method of forming marks of alignment of an edge of a cover element comprising a foam on a reverse side of a textile, skin, or synthetic material, with at least one piece of textile, skin, or synthetic material, comprising a step of forming, by molding, embossed notches in said edge, the notches forming the marks of alignment.

14. The method of claim 13, wherein said cover element is formed in a mold defining a shape of the foam, and wherein notches or strips are arranged in the mold and define said embossed notches in the foam.

15. The method of claim 13, wherein said embossed notches are formed at intervals in the range from a few centimeters to a few tens of centimeters in the periphery of the cover element.

* * * * *